Dec. 17, 1963

R. G. HOLMES 3,114,820

HEAT RESPONSIVE CONTROL CIRCUIT

Filed April 5, 1961

3 Sheets-Sheet 1

Inventor:
Robert G. Holmes,
by Lawrence R. Kempton
His Attorney.

Dec. 17, 1963   R. G. HOLMES   3,114,820
HEAT RESPONSIVE CONTROL CIRCUIT
Filed April 5, 1961   3 Sheets-Sheet 2

Inventor:
Robert G. Holmes,
by Lawrence R. Kempford
His Attorney.

Dec. 17, 1963   R. G. HOLMES   3,114,820
HEAT RESPONSIVE CONTROL CIRCUIT
Filed April 5, 1961   3 Sheets-Sheet 3
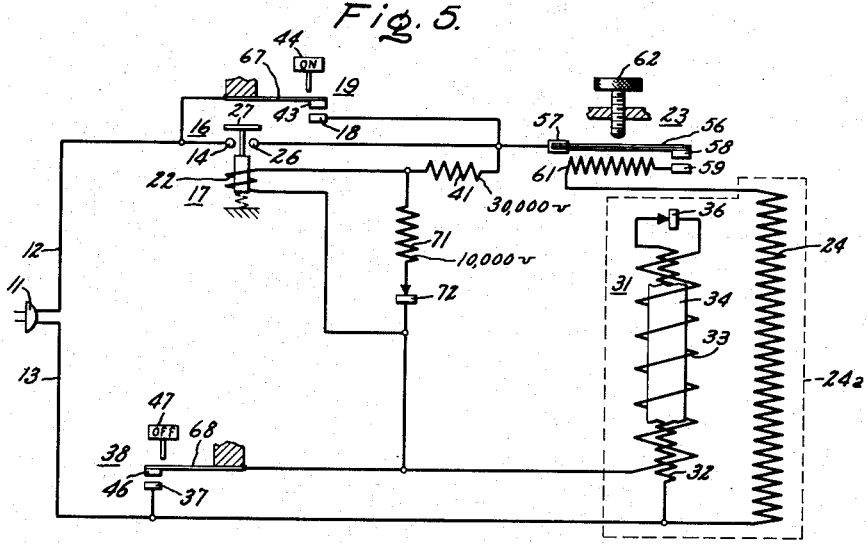
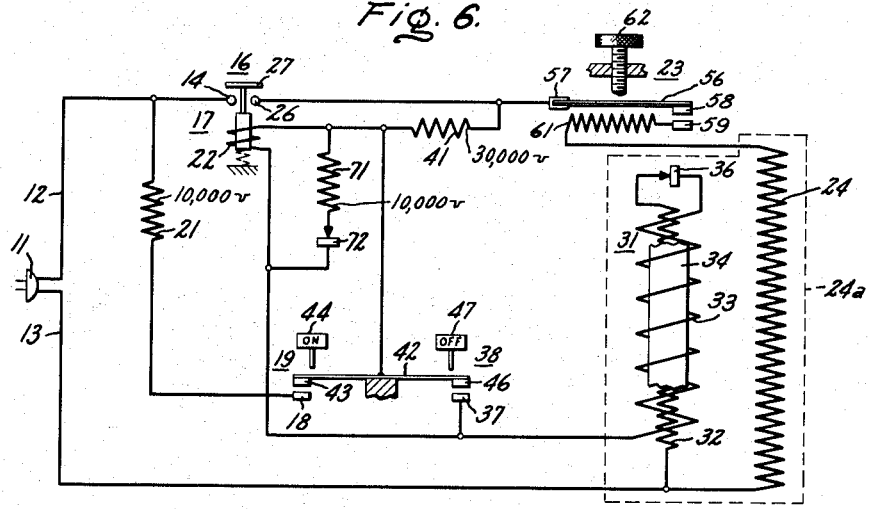
Inventor:
Robert G. Holmes,
by Lawrence R. Kempton
His Attorney.

United States Patent Office 3,114,820
Patented Dec. 17, 1963

3,114,820
HEAT RESPONSIVE CONTROL CIRCUIT
Robert G. Holmes, Reigate, England, assignor to General Electric Company, a corporation of New York
Filed Apr. 5, 1961, Ser. No. 101,017
7 Claims. (Cl. 219—20)

This invention relates to heat responsive control circuits, and particularly to control circuits for electric bedcovers.

An object of the invention is to provide an improved heat responsive control circuit for removing power from a heated device in the event of any serious tendency toward an overheat condition.

Another object is to provide an electrical bedcover and associated control circuit that is safe, effective, and economical to manufacture.

The invention comprises, essentially, a heated device such as an electric blanket or bedcover provided with a safety circuit comprising a pair of signal wires arranged in mutually parallel relationship and separated by a material having a negative temperature coefficient of resistance. A rectifier is connected between the ends of the signal wires at one end of the signal wire arrangement, and the remaining ends of the signal wires are connected in series with a source of alternating current and a circuit including the coil of a relay which is operative when direct current is applied thereto and is inoperative in response to alternating current.

Figure 1:
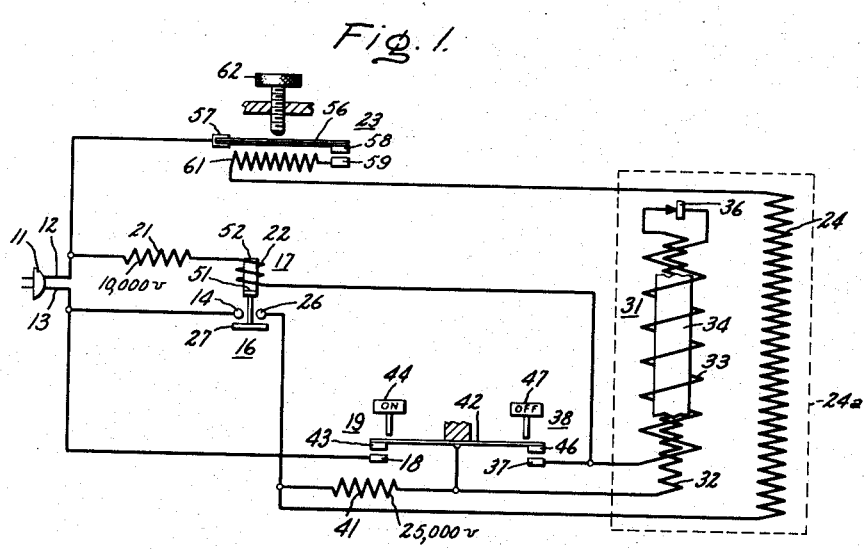

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawing in which:

FIG. 1 is an electrical schematic diagram of a preferred embodiment of the invention; and FIGS. 2 through 6 are electrical schematic diagrams of alternative embodiments of the invention.

Now referring to FIG. 1 of the drawing, a preferred embodiment of the invention comprises a power plug 11 adapted for insertion into an ordinary alternating current household power outlet and provided with two power leads 12 and 13. The power lead 13 is connected to a contact terminal 14 of a normally open switch 16 associated with a control relay 17, and also is connected to a contact terminal 18 of an "on" switch 19. The power lead 12 is connected, via a resistor 21, to an end of a winding 22 of the control relay 17, and also is connected in a parallel circuit, via an ambient responsive control 23, to an end of an electrical heater wire 24, the other end of which is connected to a remaining contact terminal 26 of the relay switch 16. The relay switch 16 is provided with a contact armature 27 adapted to complete an electrical connection across the contact terminals 14 and 26 when proper current is supplied to the winding 22 to operate the relay 17.

A safety control sensing device 31 comprises a pair of signal wires 32, 33 arranged substantially parallel to one another and separated by a material 34 having a negative temperature coefficient of resistance, such as nylon. The material 34 is in contact with both signal wires 32, 33 along the lengths thereof. As indicated, the signal wire 32 may be surrounded by the material 34, and the signal wire 33 may be placed alongside, or wrapped around, the material 34.

Typically, the heater wire 24 and the safety control sensor 31 are located in an electric bedcover or other device to be heated. The heater wire 24 may be arranged in a zig-zag pattern or other suitable configuration in the bedcover, and the safety control arrangement 31 may be arranged in a similar pattern alongside the heater wire 24, so that the safety sensor 31 receives heat from the heater wire 24 along the length thereof.

A small rectifier 36 is connected between the ends of the signal wires 32 and 33 at one end of the temperature sensor 31. The opposite end of signal wire 33 is connected to a terminal of relay winding 22, and also is connected to an "off" contact 37 of an "off" switch 38. The end of signal wire 32, opposite the rectifier, is connected to contact terminal 26 of control relay 17 via a current limiting resistor 41, and also is connected to a flexible electrically conductive switch arm 42 provided with an "on" contact 43 at one end thereof arranged to be moved against the contact terminal 18 when an "on" button 44 is depressed. The switch arm 42 is provided at the other end thereof with an "off" contact 46 adapted to engage the contact terminal 37 when an "off" button 47 is depressed.

The control relay 17 is provided with a shorted turn 51, preferably in the form of a circular copper slug, placed adjacent to the winding 22 and surrounding a magnetic core 52 of the relay 17 to provide a magnetic flux time delay sufficient to smooth the pulsating force derived from the rectifier supply and allow the relay armature 27 to seat firmly in a well-known manner.

The ambient responsive control assembly 23 comprises a bimetal strip 56 of two dissimilar materials having different coefficients of expansion in response to heat. The bimetal strip 56 is fixedly attached to a frame 57 at one end thereof, this end of the bimetal strip also being electrically connected to the power lead 12. A contact 58 is carried by the other end of the bimetal strip 56. A fixed contact 59, associatively positioned with respect to the contact 58, is electrically connected to an end of a heater element 61, the remaining end of which is connected to an end of the heater wire 24 as shown. An adjustment screw 62 is provided to control the temperature at which contacts 58 and 59 open when the bimetal strip 56 is heated. The ambient responsive control heater 61 is positioned adjacent to the bimetal strip 56, so that heat produced thereby will cause the bimetal strip 56 to bend in a direction to open the contacts 58, 59. The ambient responsive control 23 is well known, and is described in U.S. Patent Number 2,581,212 to Spooner et al. and also is described in U.S. Patent Number 2,565,478 to Crowley, both of which are assigned to General Electric Company, assignee of the present application.

The circuit of FIG. 1 operates as follows. With the power plug 11 inserted into a proper outlet for providing alternating current, the "on" button 44 is depressed momentarily, thereby closing the contact 43 against the contact 18 and completing an electrical circuit from the power lead 13 through contacts 18—43, through a portion of the switch arm 42 and through the signal wire 32, the rectifier 36, the signal wire 33, control relay winding 22, and resistor 21, to the power lead 12. The action of the rectifier 36 in this circuit causes a pulsating half-wave rectified current to flow through the relay winding 22, thereby operating the relay and causing the relay armature 27 to close against the contact terminals 14 and 26. The "on" button 44 may now be released, and the control relay 17 will remain closed in response to current supplied through it from the power lead 13, through relay contact terminals 14 and 26, through resistor 41, signal wire 32, rectifier 36, signal wire 33, relay winding 22, and resistor 21, to the power lead 12. The current for relay winding 22 now passes through resistor 41, thus limiting the current to a value sufficient to maintain the relay 17 in its closed position, whereas in the starting condition previously described, the resistor 41 is omitted from the circuit thereby supplying increased current to the relay winding 22 adequate for initial closing of the relay.

The electric blanket or other device to be heated by the heater wire 24, now functions normally, the current in the heater wire 24 being cycled on and off periodically by the action of the ambient responsive control 23, as described in the above-mentioned Spooner and Crowley patents. The temperature selection screw 62 may be adjusted to cause the contacts 58, 59 to be opened, or closed, relatively more of the time as required to provide a desired average temperature in the device heated by the heater wire 24. Furthermore, changes in room ambient temperature affect the bimetal strip 56 in a manner so that the ambient responsive control 23 compensates for changes in ambient temperature. To turn the circuit off, the "off" button 47 is depressed, thereby closing contacts 46—37 and shorting out the sensor assembly 31, including the rectifier 36, whence rectified current no longer is applied to the relay winding 22, and the relay opens the switch 16.

In the event of an overheat along any portion of heater wire 24, the portion of the material 34 adjacent thereto will become heated sufficiently so that the resistance of this material 34 will decrease to an extent permitting an amount of alternating current to flow through the material 34, between the signal wires 32 and 33, thus applying a component of alternating current to the relay winding 22 which will cause the relay 17 to open, thereby opening the electrical circuit between the contact terminals 14 and 26 and removing power from the heater wire 24. This opening of the relay occurs as soon as the alternating current component in the winding 22 reaches such a value, of reverse polarity to that of the aforesaid rectified half-cycles of current, that the magnetic flux produced by the winding 22 and the shorted turn 51 is insufficient to maintain the armature 27 closed.

Figure 2:
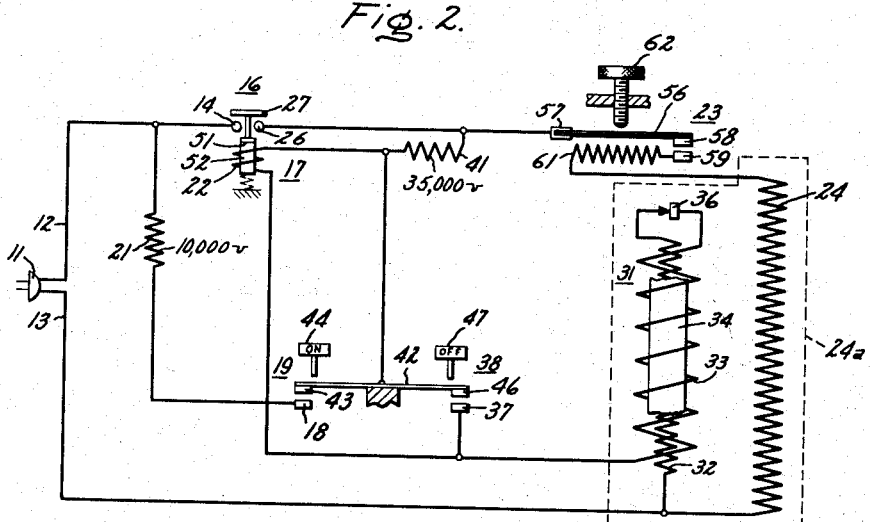

The circuit of FIG. 2 is a modification of the circuit of FIG. 1, the same reference numerals being used as in FIG. 1 where applicable. In FIG. 2, the resistors 21 and 41, the control relay 16 and the switches 19 and 38 are arranged differently than in FIG. 1. In FIG. 2, the resistor 21 is connected between the power lead 12 and the contact 18 of the "on" switch 19, and the resistor 41 is connected between an end of the relay winding 22 and the contact terminal 26 of the relay switch 16. The relay switch 16 is interposed between the power lead 12 and the ambient responsive control 23, and the switch arm 42 is connected to the junction of the relay winding 22 and the resistor 41.

The circuit of FIG. 2 functions as follows. When the "on" button 44 is depressed, thereby closing contacts 43 and 18, current flows from the power lead 12 through resistor 21, through contacts 18 and 43, through relay winding 22 and through the signal wire 33, rectifier 36, and signal wire 32, to the power lead 13, thereby providing half-cycle rectified current to the relay coil 22 which functions to close the relay switch 16. The "on" button 44 is, of course, released after the relay switch 16 has closed. The relay 17 is now maintained closed by current flowing from power lead 12, through relay switch 16, through resistor 41, relay winding 22, signal wire 33, rectifier 36 and signal wire 32 to the power lead 13. In this condition, only the resistor 41 is in the circuit, and resistor 21 is not in the circuit. Resistor 41 may be substantially higher in resistance value than resistor 21, since substantially less current is needed to hold the relay in its energized condition after its armature has been initially closed. The circuit now functions as has been described above in connection with FIG. 1. In the circuit of FIG. 2, only three wires need be provided between the electrically heated and controlled device 24a, shown in dotted lines, such as an electric blanket and the remaining components of the control circuit; whereas four such wires are required in the circuit of FIG. 1. When the "off" button 47 is depressed, the contacts 46 and 37 short circuit the relay winding 22, thereby causing the relay switch 16 to open.

Figure 3:
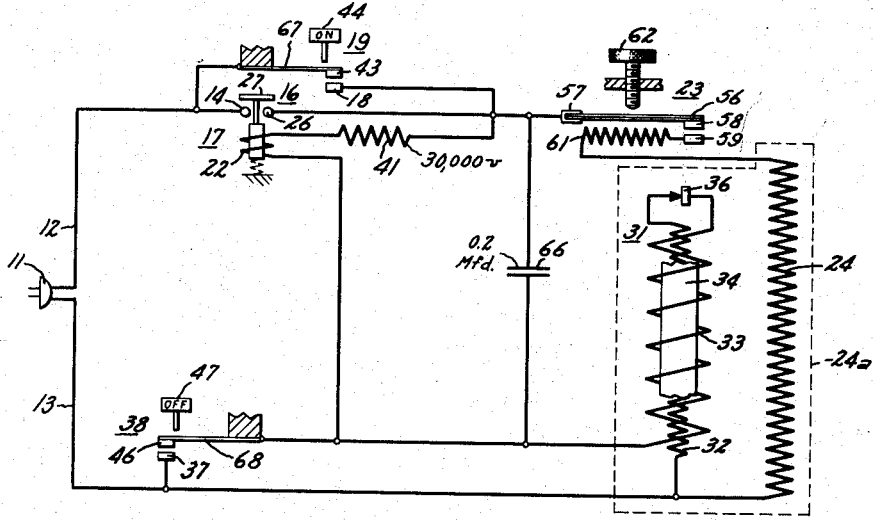

The circuit of FIG. 3 differs from that of FIG. 2 primarily in the use of a capacitor 66 instead of the shorted turn 51 on the relay 17 of FIG. 2. Furthermore, the circuit of FIG. 3 omits the resistor 21 of FIG. 2, and the "on" and "off" switches are arranged differently. More particularly, in FIG. 3, a capacitor 66 is connected between the contact terminal 26 of relay 17, and the junction of signal wire 33 and the relay winding 22. The "on" switch 19 comprises a fixed contact 18 connected to the relay contact terminal 26, and a movable contact 43 attached to a switch arm 67 which is electrically connected to the power lead 12. The "off" switch 38 comprises a fixed contact 37 connected to the power lead 13, and a movable contact 46 attached to a switch arm 68 electrically connected to the junction of the relay winding 22 and the signal wire 33. The capacitor 66 functions to filter the rectified half-cycle current produced by the rectifier 36 sufficiently so that the relay 17 will operate from this filtered rectified current, whereas the relay 17 will not remain energized in the presence of significant unfiltered, pulsating or alternating current supplied to its winding 22.

The circuit of FIG. 3 functions as follows. When the "on" button 44 is depressed, thereby closing contact 43 against 18, a circuit is established from the power lead 12, through contacts 43 and 18 and through the resistor 41, the relay winding 22, the signal wire 33, the rectifier 36, and the signal wire 32, to the power lead 13. Thus, rectified and filtered current is supplied to the relay winding 22, thereby closing the relay armature 27 against the contact terminals 14 and 26. Upon release of the "on" button 44, the closed relay switch 16 maintains a current path for providing filtered rectified current through the relay winding 22 for maintaining the relay 17 in its closed position. In this condition, the heater wire 24 and safety control arrangement 31 functions as has been described above, whereby an overheat condition in the blanket or other device heated by the heater wire 24, will cause an alternating leakage current to flow through the material 34 between the signal wires 32 and 33, thereby allowing capacitor 66 to discharge through the circuit path provided by material 34 as well as coil 22, thus reducing the ability of capacitor 66 to provide sufficient average holding force for armature 27 by filtering action, whereupon the relay drops out and the switch 16 opens, thereby removing power from the heater wire 24. To turn the circuit off when it is normally operating, the "off" button 47 is depressed, thereby closing contact 46 against contact 37 and shorting out the rectifier 36 from the circuit so that alternating current only is supplied to the relay winding 22, whereupon the relay switch 16 opens.

Figure 4:
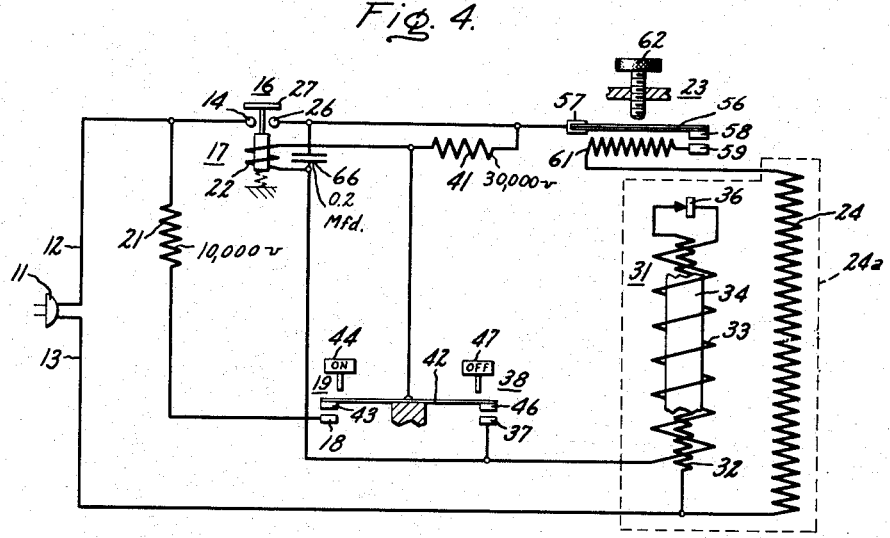

The circuit of FIG. 4 is similar to that of FIG. 2, except that a filter capacitor 66 is connected, as shown in FIG. 3 and described above, in lieu of the shorted turn 51 on the relay 17 as shown in FIG. 2. The functioning of FIG. 4 is the same as described above in connection with FIG. 2, the only difference being that the capacitor 66 of FIG. 4 functions in lieu of the shorted turn 51 of FIG. 2 to render the relay 17 operable from rectified half-cycle current.

FIGS. 5 and 6 are respectively similar to FIGS. 3 and 4, except that a rectifier type of filter is used in lieu of the capacitor filter 56 of FIGS. 3 and 4. In FIGS. 5 and 6, the filter for enabling the relay 17 to function from rectified half-cycle current as provided by the rectifier 36, comprises a resistor 71 and rectifier 72 connected in series across the relay winding 22. The functioning of the circuits of FIGS. 5 and 6 are otherwise the same as described above in connection with FIGS. 3 and 4, respectively.

The values shown for the different components in the figures of the drawings are representative values suitable when the relay winding 22 has a resistance of five thousand ohms, and when an alternating voltage of 115 v. is applied to the power leads 13 and 12. For other operating conditions, suitable values for the components can be determined by calculation or experiment.

While preferred embodiments of the invention have been shown and described, various other embodiments and modifications thereof will be apparent to those skilled in the art, and will fall within the scope of invention as defined in the following claims.

What I claim as new and desire to secure by Letters Patent of the United States is:

1. In an electrically heated device including an electric heater, a heat responsive control circuit comprising a pair of signal wires physically arranged substantially mutually in parallel, said pair of signal wires being electrically connected in parallel with said heater, a material having a negative coefficient of resistance positioned between and in contact with said signal wires, a rectifier connected between an end of one of said signal wires and an end of the other of said signal wires, a control device adapted to distinguish between rectified current and alternating current, a source of alternating current, and means connecting the remaining ends of said signal wires between said control device and said source of alternating current.

2. A control circuit as claimed in claim 1, in which said control device comprises a relay having a winding connected to receive current that passes through said signal wires and rectifier, and including electrical filter means connected to said winding for filtering the current rectified by said rectifier.

3. A circuit as claimed in claim 2, in which said filter comprises a circuit including a capacitor connected across said relay winding.

4. A circuit as claimed in claim 2, including an "off" switch comprising means for temporarily completing an electrical circuit between said remaining ends of the signal wires.

5. An electrically heated bedcover or the like comprising a heater wire, a relay comprising a control winding and an electrical switch connected to supply power to said heater wire when said relay is actuated, said relay control winding being adapted to close said switch in response to rectified alternating current applied to said winding, a filtering means to hold said relay closed when said current is applied, a safety control arrangement positioned adjacent said heater wire and comprising a pair of signal wires physically arranged substantially mutually parallel, said pair of signal wires being electrically connected in parallel with said heater, a material having a negative coefficient of resistance positioned between and in contact with said signal wires, a rectifier connected between an end of one of said signal wires and an end of the other of said signal wires, a source of alternating current, and means connecting the remaining ends of said signal wires between said relay control winding and said source of alternating current.

6. In an electrically heated device including an electric heater, a heat responsive control circuit comprising a pair of signal wires arranged substantially mutually in parallel, a material having a negative coefficient of resistance positioned between and in contact with said signal wires, a rectifier connected between an end of one of said signal wires and an end of the other of said signal wires, a control device adapted to distinguish between rectified current and alternating current, said control device including a relay having a winding connected to receive current that passes through said signal wires and rectifier along with a shorted turn magnetically coupled to said relay winding for filtering the current rectified by said rectifier, a source of alternating current, and means connecting the remaining ends of said signal wires between said control device and said source of alternating current.

7. In an electrically heated device including an electric heater, a heat responsive control circuit comprising a pair of signal wires arranged substantially mutually in parallel, a material having a negative coefficient of resistance positioned between and in contact with said signal wires, a rectifier connected between an end of one of said signal wires and an end of the other of said signal wires, a control device adapted to distinguish between rectified current and alternating current, said control device comprising a relay having a winding connected to receive current that passes through said signal wires and rectifier, a filter circuit connected to said winding for filtering the current rectified by said rectifier and including a further rectifier connected across said winding, a source of alternating current, and means connecting the remaining ends of said signal wires between said control device and said source of alternating current.

References Cited in the file of this patent

UNITED STATES PATENTS

| | | |
|---|---|---|
| 2,581,213 | Spooner | Jan. 1, 1952 |
| 2,768,274 | Estes | Oct. 23, 1956 |
| 2,780,709 | Thompson et al. | Feb. 5, 1957 |